US 6,546,086 B1

(12) United States Patent
Hägebarth

(10) Patent No.: US 6,546,086 B1
(45) Date of Patent: Apr. 8, 2003

(54) PROCESS FOR PLACING AND READING AN ADVERTISEMENT

(75) Inventor: Frank Hägebarth, Kirchheim (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/500,441

(22) Filed: Feb. 9, 2000

(30) Foreign Application Priority Data

Feb. 12, 1999 (DE) .......................... 199 05 825

(51) Int. Cl.⁷ .......................... H04M 1/64; H04M 15/00
(52) U.S. Cl. .................. 379/88.22; 379/67.1; 379/76; 379/88.13; 379/88.17; 379/114.12; 379/114.13
(58) Field of Search .................. 379/67.1, 71, 72, 379/76, 79, 88.04, 88.13, 88.17, 88.19, 88.22, 88.23, 93.12, 114.12, 114.13

(56) References Cited

U.S. PATENT DOCUMENTS

| | | | | |
|---|---|---|---|---|
| 4,850,007 A | * | 7/1989 | Marino et al. ............. | 379/67.1 |
| 5,179,585 A | | 1/1993 | MacMillan, Jr. et al. ..... | 379/88 |
| 5,506,897 A | | 4/1996 | Moore et al. ............... | 379/220 |
| 5,517,562 A | | 5/1996 | McConnell ................. | 379/207 |
| 5,557,658 A | * | 9/1996 | Gregorek et al. .......... | 379/67.1 |
| 5,726,909 A | * | 3/1998 | Krikorian ................. | 364/514 R |
| 5,727,048 A | | 3/1998 | Hiroshima et al. ....... | 379/93.12 |
| 5,835,583 A | * | 11/1998 | Hetz et al. ................... | 379/220 |
| 5,923,734 A | * | 7/1999 | Taskett .................... | 379/88.25 |
| 5,970,124 A | * | 10/1999 | Csaszar et al. .......... | 379/88.18 |
| 6,018,710 A | * | 1/2000 | Wynblatt et al. .......... | 704/260 |
| 6,215,858 B1 | * | 4/2001 | Bartholomew et al. .. | 379/88.17 |
| 6,226,289 B1 | * | 5/2001 | Williams et al. ............ | 370/385 |

FOREIGN PATENT DOCUMENTS

| | | |
|---|---|---|
| DE | 692 20 534 T2 | 12/1997 |
| EP | 0 453 831 A2 | 10/1991 |
| EP | 0 588 101 A2 | 3/1994 |
| WO | WO 98/00955 | 1/1998 |

OTHER PUBLICATIONS

Ratgeber, Kommunikation . In: CompuServe entdecken, Jan./Feb. 96, pp. 19–22, 24, 25, 27–29, 110; s. insb. S. 28, "Eingene Nachrichten" sowie S. 110, " . . . Kleinanzeige . . . ".

* cited by examiner

*Primary Examiner*—Allan Hoosain
(74) *Attorney, Agent, or Firm*—Sughrue Mion, PLLC

(57) ABSTRACT

The invention concerns a process and a system for placing and reading an advertisement. In order to place and read advertisements without undue delay and to reach the largest possible group of interested people with a published advertisement, a process is proposed that is characterised by the following steps:

dialling of a specified directory number of a service computer in a telecommunications (TC) network (1) and making a connection to the service computer (2);

selection of a desired category of advertisement (4); and input of advertising copy (6) into or output of advertising copy (12) from an advertisement memory (10) allocated to the selected category.

24 Claims, 1 Drawing Sheet

PROCESS FOR PLACING AND READING AN ADVERTISEMENT

BACKGROUND OF THE INVENTION

This invention concerns a process for placing and reading an advertisement. The invention also concerns a system for placing and reading an advertisement.

It is known from the prior art for advertisements to be placed in printed form in printed media or as electronic advertisements in computer networks, in particular on the Internet, which is accessible worldwide. A person placing an advertisement attempts, via this advertisement, to reach a group of interested people and to offer this group of people a product or service. In order to read an advertisement, the corresponding printed media usually have to be purchased or the corresponding addresses searched for in a computer network. A person reading an advertisement attempts to obtain offers for goods and services in this way.

The conventional publication of advertisements in the printed media has the drawback that it usually has very long response times. The person wishing to place an advertisement drafts the text of the advertisement and sends it by post, as a fax or as electronic mail (e-mail) to the publisher of the printed media. Here the advertising copy is put into a form suitable for printing. The advertising copy, together with information for identifying the person who has placed the advertisement, is published in the following issue of the printed media. The information for identification includes, for example, a box number, the telephone number or e-mail address or the name and the address of that person who has placed the advertisement. From the drafting of the advertising copy to the publication of the advertisement takes several days. A fast response to changes in the advertisement is not possible with such a large delay in publication.

Moreover, the printed media usually cover a relatively large geographical area in order to achieve the large circulation figures for the printed medium that are required for the profitability of the printed medium. Since the persons reading the advertisements usually look for advertisements in their immediate neighbourhood, the selection of suitable advertisements from the multitude of countrywide advertisements is often very costly and laborious.

The growing use of the Internet for publishing advertisements, especially more recently, has much faster response times than the publication of advertisements in the printed media. Of course, the advertising systems still operate in a supra-regional manner on the Internet, usually even nationally or internationally. There are so many advertising systems on the Internet that a person wishing to read an advertisement often gets no overall picture. Furthermore, the number and quality of the advertisements varies so widely that they are scarcely attractive to a person wishing to read an advertisement on a specific subject or for a specific geographical area. In addition, a large proportion of the group of interested people may still not be reached on the Internet for the foreseeable future.

SUMMARY OF THE INVENTION

The object of this invention is therefore to create and develop a process of the type referred to at the outset, to the effect that advertisements can be placed and read without a long delay and that the largest possible group of interested people can be reached.

To solve this problem and based on the process of the type referred to at the outset, the invention proposes a process that is characterised by the following steps:

- dialling of a specified directory number of a service computer in a telecommunications (TC) network and making a connection to the service computer;
- selection of a desired category of advertisement; and
- input of advertising copy into or output of advertising copy from an advertisement memory allocated to the selected category.

With the process according to the invention, the advertisements appear neither in printed form in printed media not in electronic form in a computer network, in particular on the Internet. Rather, the advertisements are available as voice messages on the service computer of a telecommunication (TC) network.

First of all, a specific directory number of a service computer in the TC network is dialled via a terminal of a telephone network and a connection made to the service computer via the telephone network. The service computer is designed as a voice server, for example, and functions as it were as a central advertising office for the acceptance and distribution of advertisements. The service computer allows the selection irrespective of whether a new advertisement is to be placed or published advertisements are to be read. This selection is effected either via voice input or via the keyboard of a terminal of the telephone network.

A desired category of advertisement is then selected. As a result, either the category under which a new advertisement is to be stored, or the category from which an interested person wishes to call up the stored advertisements, can be selected. This selection is also made either via voice input or via the keyboard of a terminal of the telephone network. It is conceivable to store each advertisement in the advertisement memory with a code which produces the selected category. It would also be conceivable to store the advertisements in specific areas of the advertisement unit according to the selected category.

Finally, in order to place an advertisement the advertising copy is input. The advertising copy is stored in an advertisement memory of the service computer under the selected category. The service computer controls the advertisement memory. In addition to the advertising copy, other details can also be input and stored in the advertisement memory. If the memory capacity of the advertisement memory is used up, the oldest advertisement is automatically deleted.

To read an advertisement, the advertising copy is output from the advertisement memory. Only those advertisements that are stored in the advertisement memory under the selected category are output. The advertisements of a category can be sorted according to various criteria then output. The various advertisement criteria can be selected via a terminal of the telephone network at the service computer. The retrieval of the advertisement is effected via voice output at a service computer designed as a voice server. The output of the advertisements can be charged by a fee via the telephone bill.

The process according to the invention has a considerably shorter response time than the known process for placing and reading advertisements via the printed media. Moreover, a considerably larger group of interested people can be reached with advertisements that are placed and/or read with the process according to the invention, than is possible with advertisements that are placed and read via the Internet, since these days a telephone handset is available in virtually every household. The process according to the invention consequently combines the advantages of the known processes, but without having their drawbacks.

Advantageously, the advertising copy is input by means of voice input into an advertisement memory designed as a voice mailbox. The invention also proposes that the advertising copy be output by means of voice output from an advertisement memory designed as a voice mailbox.

According to a preferred embodiment the selection of the category is made by selecting a classification number assigned to the category. The selection of the category is made either via voice input or via the keyboard of a terminal of the telephone network.

According to a preferred development of this invention, it is proposed that data for identifying the person placing the advertisement be transmitted via the connection to the service computer, and that these data be added by the service computer to the advertising copy. It is conceivable that the addition of the personal data to the advertising copy is conditional on the agreement of the person who has placed the advertisement. In modern telephone networks it is possible, for example, for the terminal to automatically transmit certain personal data to the service computer of the TC network.

Advantageously, the directory number of the person is transmitted via the connection to the service computer and by means of the directory number further data related to the person are called up by the service computer from a databank to which the service computer has access. This databank, for example, is part of the telephone network and contains the data of the telephone subscriber, such as directory number, name, address and account data.

Advantageously, the date and/or time the advertisement is placed is added to the advertising copy by the service computer. The date and time details are used on the one hand as information for interested persons reading the advertisements at the time these were placed. On the other hand, the contents of the advertisement memory can be managed by means of the date and time and regularly updated. The updating of the advertisement memory also includes the erasure of older advertisements, for example.

The advertisements are preferably sorted and then output according to the date and/or time the advertisement is placed. This ensures that the interested persons hear about the latest advertisements first, assuming that they are more up-to-date than the older advertisements.

According to an advantageous development of the invention it is proposed that a desired geographical area of the advertisement be selected. The selection of the geographical area serves to limit the advertisements. When the advertisements are called up, only those advertisements that are assigned to the selected geographical area are output to the interested persons. The geographical area can be defined locally or by specifying a surrounding area (for example 10 km around the place of residence of the person who has placed the advertisement). The selection of the geographical area can also be made via a multiple choice query (for example selection 1: LOCAL; selection 2: REGIONAL; selection 3: NATIONWIDE). Only the desired selection number has then to be input for the selection.

Advantageously, the geographical area is selected according to the area code of the directory number of the person who has placed the advertisement. By this means, the selection of the geographical area can be made automatically in telephone networks in which the directory number of the caller is automatically transmitted to the called subscriber. LOCAL then corresponds for example to the area code 0711, REGIONAL to the area code 07xx and NATIONAL to the remainder of Germany.

The advertisement is preferably stored in the advertisement memory according to the geographical area. It is conceivable to store each advertisement in the advertisement memory with a code which produces the selected geographical area. It would also be conceivable to store the advertisements in specific areas of the advertisement unit according to the selected geographical area.

A further object of this invention consists in creating a system of the type referred to at the outset, with which advertisements can be placed and read without undue delay and the largest possible group of interested people can be reached.

To achieve this object, based on the system of the type referred to at the outset, the invention proposes a system that is characterised by a terminal of a telephone network for dialling a specified directory number of a service computer in a telecommunications (TC) network and for making a connection to the service computer;

means for selecting a desired category;

an advertisement memory for storing advertising copy according to the selected category; and means for inputting the advertising copy into the advertisement memory or means for outputting the advertising copy from the advertisement memory.

The advertisement memory is preferably designed as a voice mailbox. The TC network is advantageously designed as an intelligent network (IN), wherein the service computer controls certain functions of the IN. An IN has been known for a long time in the telecommunications engineering field. The construction and operation of such an IN is disclosed in WO 98/00955, for example.

According to a preferred embodiment of this invention it is proposed that the advertisements are stored in the advertisement memory according to their geographical area. The geographical area of an advertisement specifies in which area the advertisement is to be valid. The selection of the geographical area serves to limit the advertisements. When the advertisements are called up, only those advertisements that are assigned to the selected geographical area are output to the interested persons.

According to an advantageous development of the invention, it is proposed that the system has means for selecting a desired geographical area of the advertisement. The means preferably select the geographical area according to the area code of the directory number of the person who has placed the advertisement.

According to a preferred embodiment of the invention, it is proposed that the system has means for adding the date and/or time the advertisement is placed to the advertising copy.

According to a particularly preferred development of this invention, it is proposed that the system has means for dialling the directory number of the person who has placed the advertisement, and for making a connection to this person. If an advertisement has been output to an interested person who has a special interest in it, the interested person can, via the means for dialling the directory number, directly contact the person who has placed the advertisement.

BRIEF DESCRIPTION OF THE DRAWINGS

A preferred exemplary embodiment of this invention is explained below with the aid of a drawing in which.

DETAILED DESCRIPTION OF THE INVENTION

Figure 1:
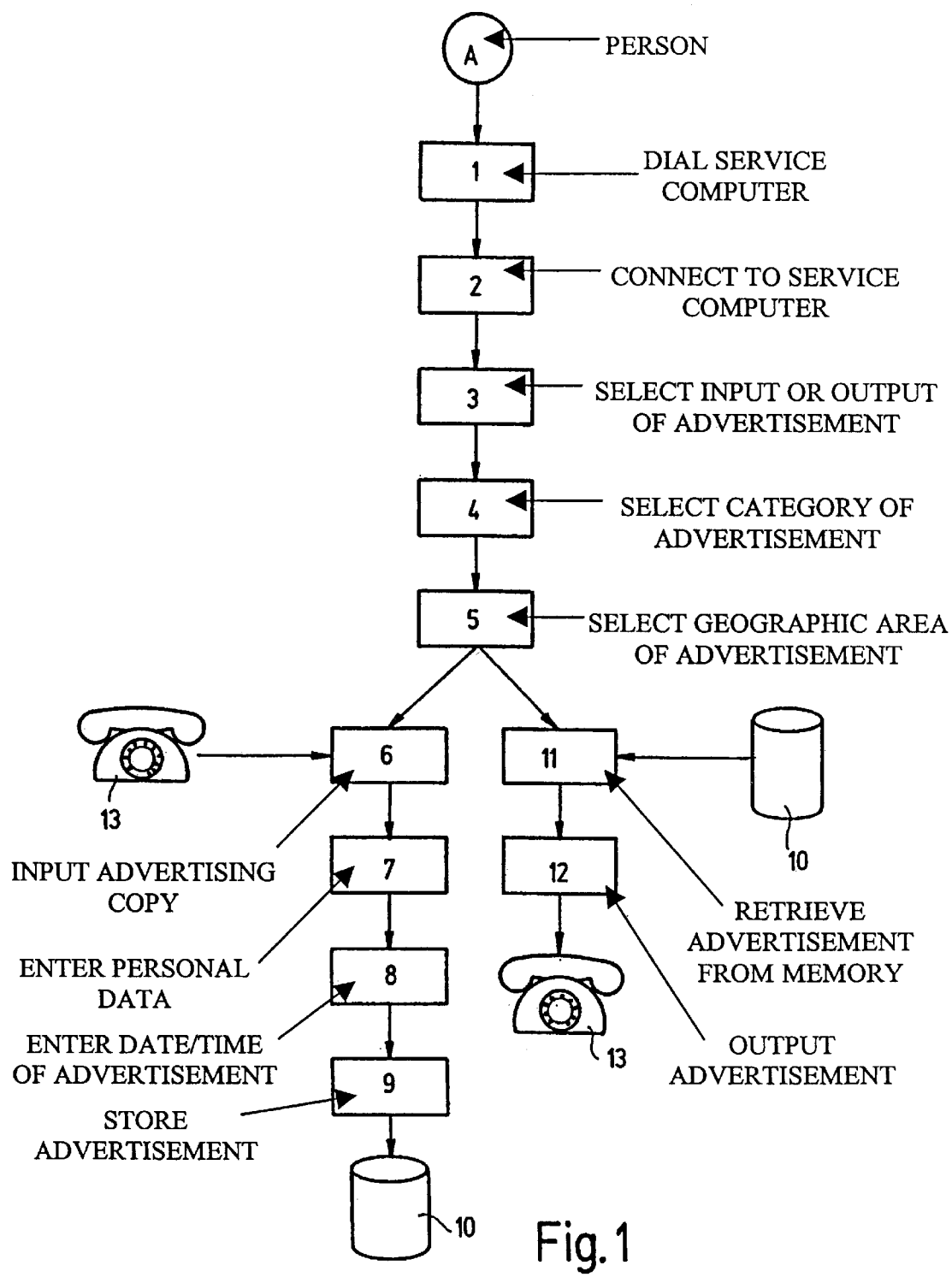
FIG. 1 shows a flowchart of a process according to the invention with reference to a preferred embodiment.

A flowchart of a process according to the invention with reference to a preferred embodiment is shown in FIG. 1.

The process starts with a person A who wishes to place or read an advertisement and dials via a terminal of a telephone network a specified directory number of a service computer in a telecommunications (TC) network (Step 1) and makes a connection to the service computer (Step 2). The TC network is, for example, designed as an intelligent network (IN), wherein the service computer controls certain functions of the IN. The service computer is designed as a voice server, for example, and functions as it were as a central advertising office for the acceptance and distribution of advertisements. The service computer allows the selection irrespective of whether a new advertisement is to be placed (Step 3) or published advertisements are to be read. This selection is effected either via voice input or via the keyboard of a terminal of the telephone network.

A desired category of advertisement is then selected in Step 4. As a result, the person A can either select the category under which he/she would like to place a new advertisement, or select the category from which he/she would like to call up the published advertisement. This selection is also made either via voice input or via the keyboard of a terminal of the telephone network.

Finally, in Step 5 the person A selects the desired geographical area of the advertisement. The selection of the geographical area serves to limit the advertisements. When the advertisements are called up, only those advertisements that are assigned to the selected geographical area are output to a person A who wishes to retrieve the published adverts. The geographical area can be defined by means of local boundaries or by specifying a surrounding area (for example 10 km around the place of residence of the person who has placed the advertisement). The selection of the geographical area can also be made via a multiple choice query (for example selection 1: LOCAL; selection 2: REGIONAL; selection 3: NATIONWIDE). Only the desired selection number has then to be input in the terminal of the telephone network for the selection.

Instead of allowing the geographical area to be selected by the person A, as in Step 5, this geographical area can also be determined automatically by the service computer. To do this, the process can utilise the facility that certain personal data are transmitted either automatically via the connection between the terminal of person A and the service computer, or loaded from a databank to which the service computer has access. Such personal data are, for example, the directory number of the person A. The desired geographical area can then be determined automatically by means of the area code of the directory number (for example 0711: LOCAL; 07xx: REGIONAL; otherwise NATIONWIDE).

The process then branches, depending on whether in Step 3 the placing or reading of an advertisement was selected. For the placing of an advertisement, the advertising copy is input in Step 6. The advertisement is input by means of voice input via the terminal 13 of the telephone network.

In addition to the advertising copy, other details can also be input and stored. Thus, in Step 7, personal data (for example name, address, directory number, bank) and in Step 8 the date and/or time the advertisement is placed, can be added to the advertising copy.

In Step 9, the advertising copy, together with the personal data from Steps 7 and 8, is stored in an advertisement memory 10, designed as a voice mailbox, of the service computer.

In order to call up a published advertisement, the advertising copy is retrieved from the advertisement memory 10 in Step 11. The retrieved advertising copy is then output in Step 12. Only those advertisements are output that correspond to the selected category and the selected geographical area. The advertisements can be sorted and output according to various criteria, for example publication date. The sorting criteria can be selected via the terminal of the telephone network at the service computer. In the case of a service computer designed as a voice server, the advertisements are output by means of voice output at the terminal 13 of the person A. The output of the advertisements can be charged to the person A by a fee via the telephone bill.

What is claimed is:

1. A method for providing an advertisement copy stored on a telecommunications network to a customer, wherein the method comprises:

establishing a connection between a service computer and the customer;

selecting a desired category of advertisement, wherein the customer makes the category selection through the service computer;

selecting a desired geographical area from a plurality of geographical areas, wherein the customer makes the geographical selection through the service computer; and outputting the advertising copy from an advertisement memory allocated to the selected category and the selected geographical area to the customer.

2. The method according to claim 1, wherein the advertising copy is input by voice input into the advertisement memory comprising a voice mailbox.

3. The method according to claim 1, wherein the advertising copy is output by voice output from the advertisement memory comprising a voice mailbox.

4. The method according to claim 1, wherein the category is selected by selecting a classification number assigned to the category.

5. The method according to claim 1, wherein data for identifying a person who placed the advertisement is transmitted via the connection to the service computer, and the data is added to the advertising copy by the service computer.

6. The method according to claim 5, wherein a directory number of the person who placed the advertisement is transmitted via the connection to the service computer, and the service computer uses the directory number to call up further data related to the person from a databank to which the service computer has access.

7. The method according to claim 1, wherein at least one of the date or the time of placement of the advertisement is added to the advertising copy by the service computer.

8. The method according to claim 7, wherein the advertisements are sorted and output according to at least one of the date or the time that the advertisement was placed.

9. The method according to claim 1, wherein the plurality of geographical areas comprises at least a local area, a regional area and a national area.

10. The method according to claim 9, wherein the advertisement is stored in the advertisement memory according to the geographical area.

11. The method according to claim 9, wherein the geographical area is selected according to the area code of the directory number of a person who has placed the advertisement.

12. A system for providing advertisements stored on a telecommunications network to a customer, the system comprising:

a terminal for establishing a connection between a service computer and the customer;

an advertisement memory for storing advertising copy in a plurality of categories;

means for selecting a desired category, wherein the customer makes the category selection through the service computer;

means for selecting a desired geographical area from a plurality of geographical areas, wherein the customer makes the geographical selection through the service computer; and means for outputting the advertising copy from the advertisement memory to the customer.

13. The system according to claim 12, wherein the advertisement memory comprises a voice mailbox.

14. The system according to claim 12, wherein the telecommunications network is designed as an intelligent network, wherein certain functions of the intelligent network are controlled by the service computer.

15. The system according to claim 12, wherein the plurality of geographical areas comprises at least a local area, a regional area and a national area.

16. The system according to claim 15, wherein the geographical area can be selected according to the area code of the directory number of a person who has placed the advertisement.

17. The system according to claim 15, wherein the advertisements are stored in the advertisement memory according to their geographical area.

18. The system according to claim 12, wherein the system has means for adding at least one of the date or time of placement of the advertisement to the advertising copy.

19. The system according to claim 12, wherein the system has means for dialling the directory number of a person who placed the advertisement, and for making a connection to the person who placed the advertisement.

20. A system for providing advertisements stored on a telecommunications network to a customer, the system comprising:

a terminal for establishing a connection between a service computer and the customer;

an advertisement memory for storing advertising copy in a plurality of categories;

a first selection device for selecting desired category from the plurality of categories, wherein the customer makes the category selection through the service computer;

a second selection device for selecting a desired geographical area from a plurality of geographical areas, wherein the customer makes the geographical selection through the service computer; and an output device that outputs the advertising copy from the advertisement memory to the customer.

21. The system according to claim 20, wherein the plurality of geographical areas comprises at least a local area, a regional area and a national area.

22. The system according to claim 21, wherein the geographical area can be selected according to the area code of the directory number of a person who has placed the advertisement.

23. The system according to claim 20, wherein the system adds at least one of the date or time of placement of the advertisement to the advertising copy.

24. The system according to claim 20, wherein the system further comprises a dialer for dialling the directory number of a person who placed the advertisement, and for making a connection to the person who placed the advertisement.

* * * * *